June 19, 1962 C. F. PHILLIPS ET AL 3,039,300
SERVICING AND TESTING DEVICE FOR VALVE BRIDGES AND
HYDRAULIC LASH ADJUSTERS OF DIESEL ENGINES
Filed Oct. 22, 1958 7 Sheets-Sheet 3
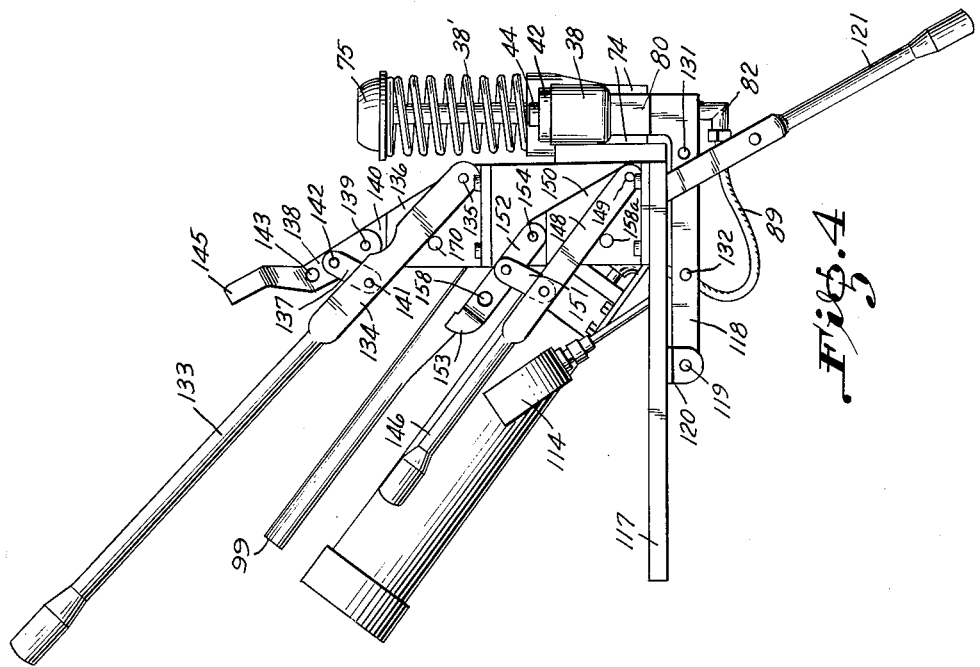
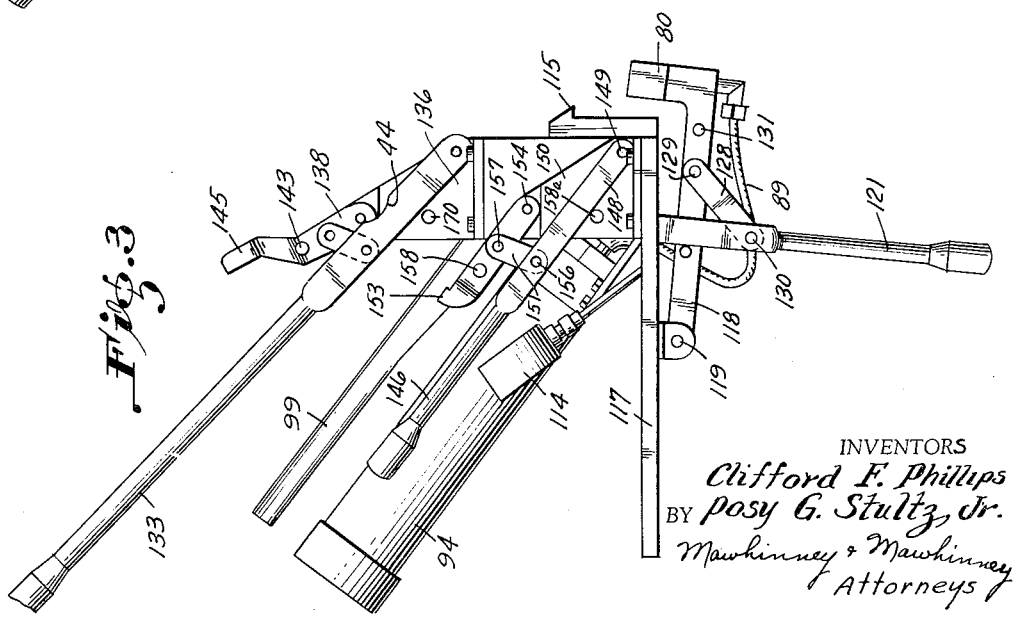
INVENTORS
Clifford F. Phillips
BY Posy G. Stultz, Jr.
Mawhinney & Mawhinney
Attorneys

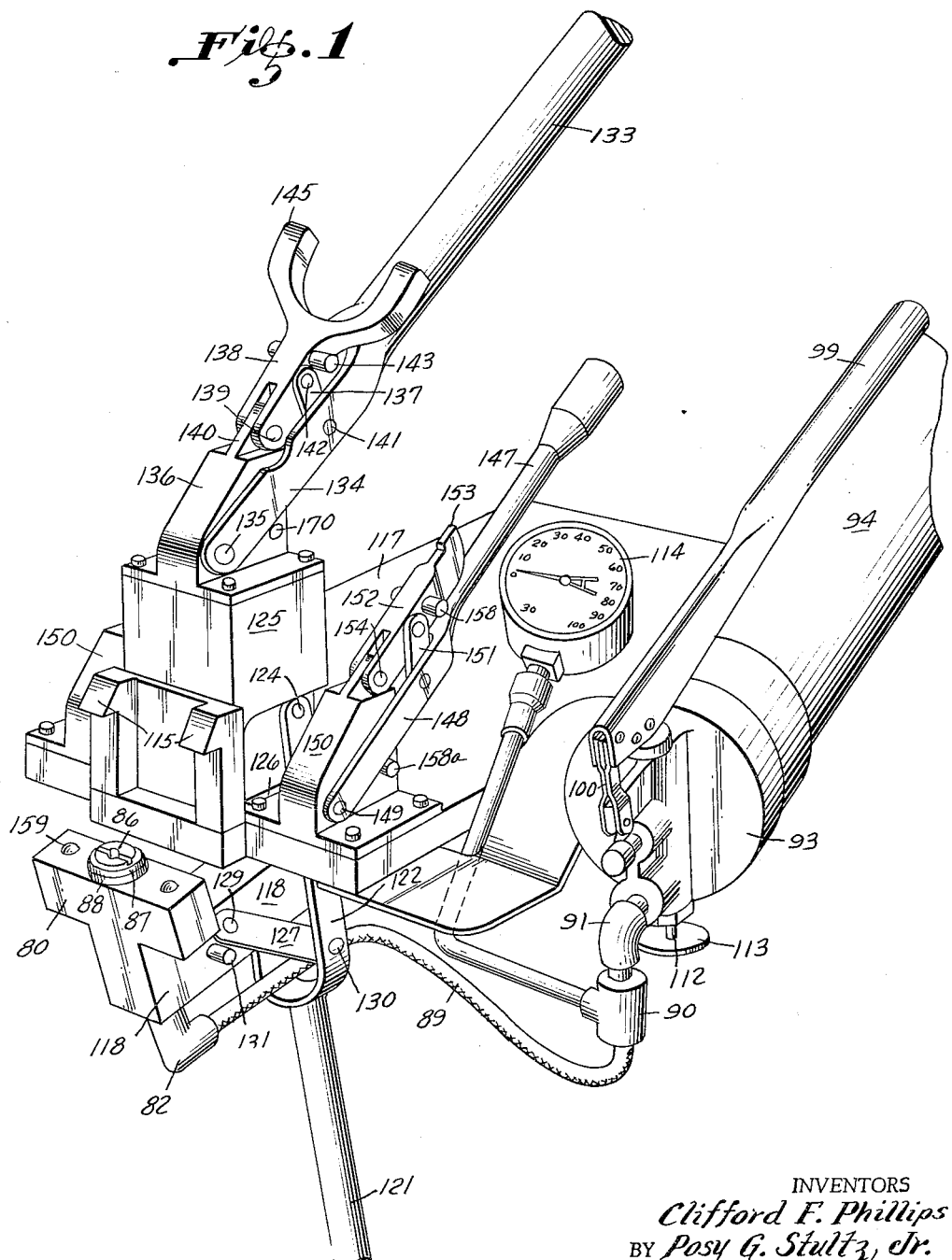

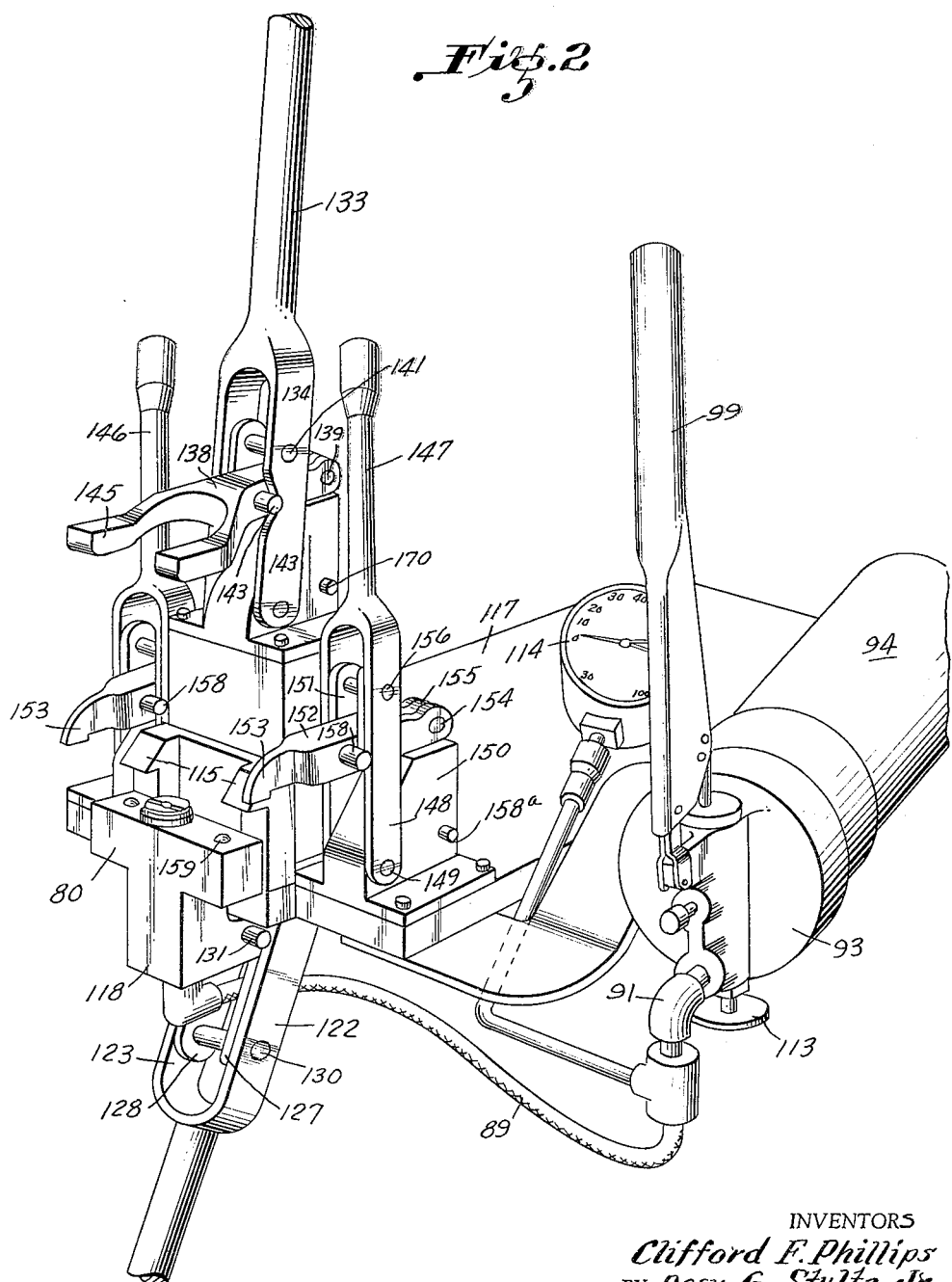

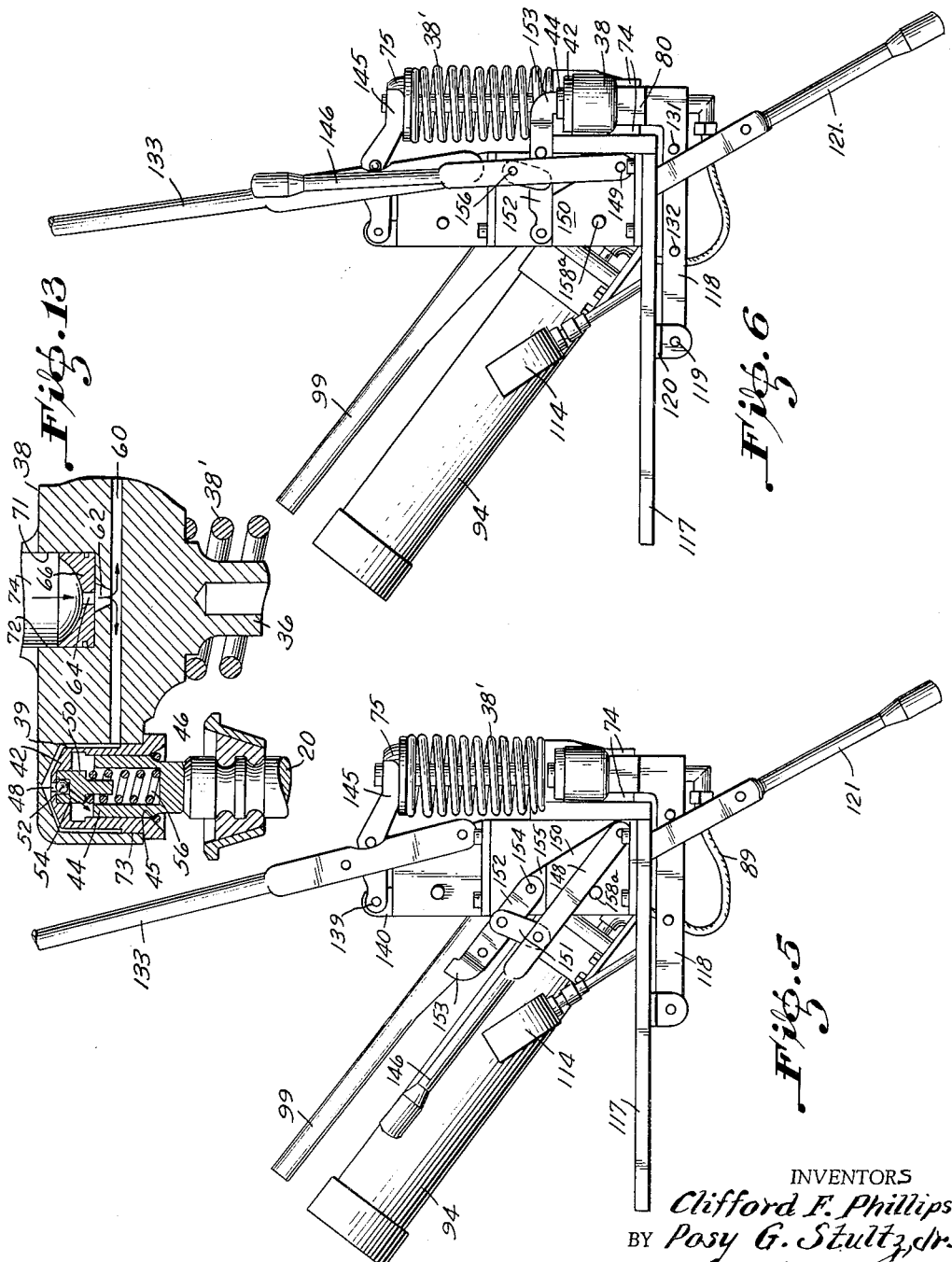

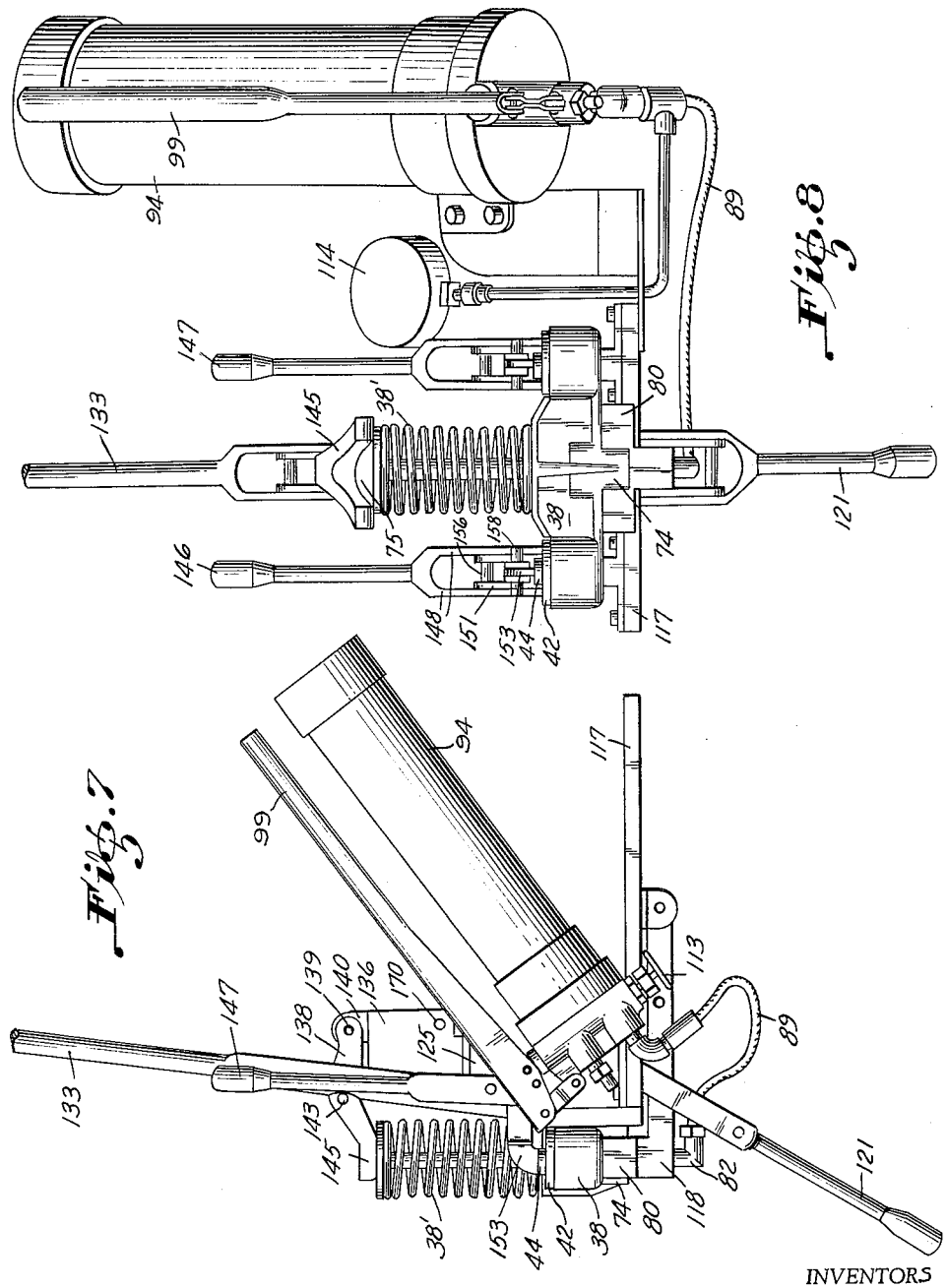

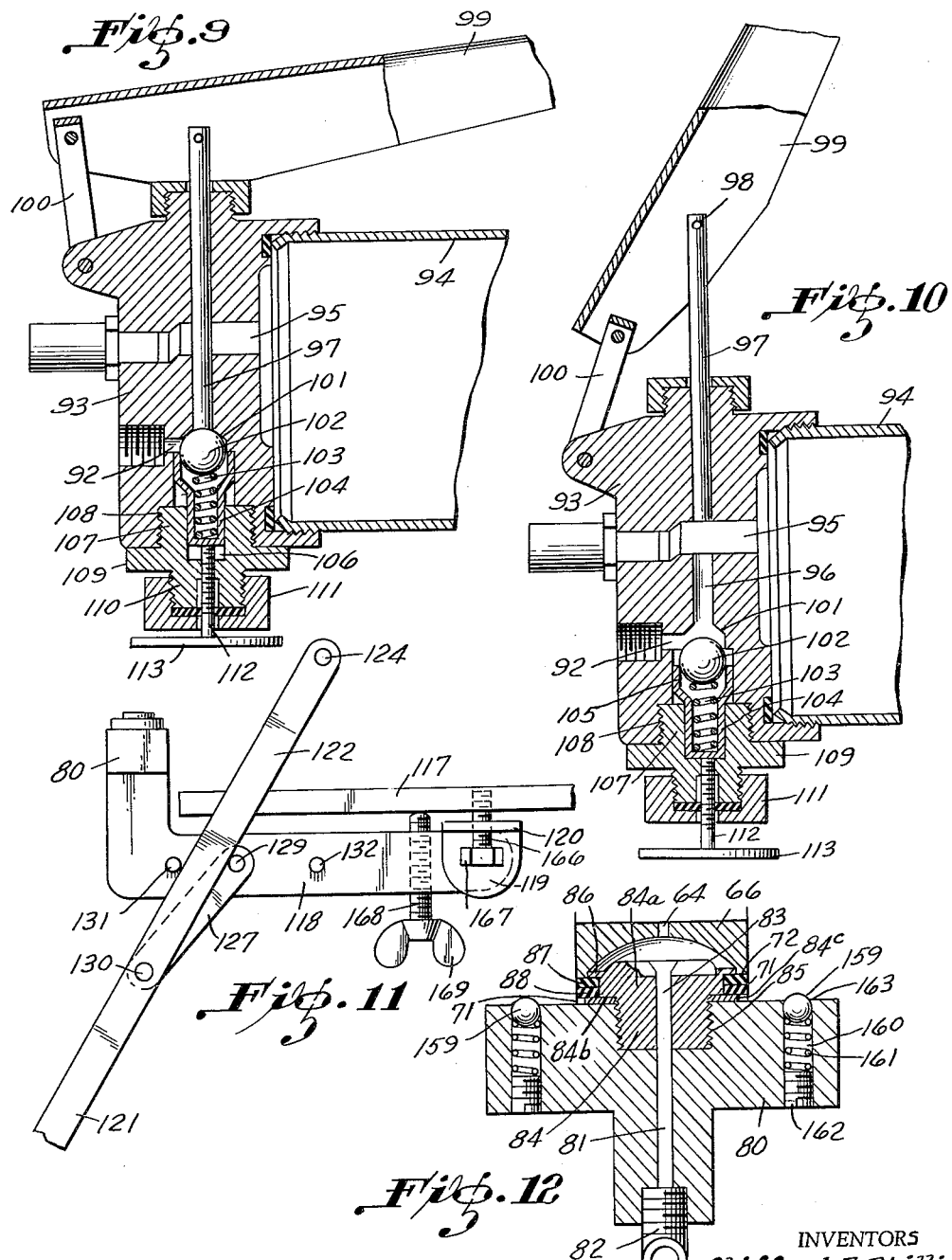

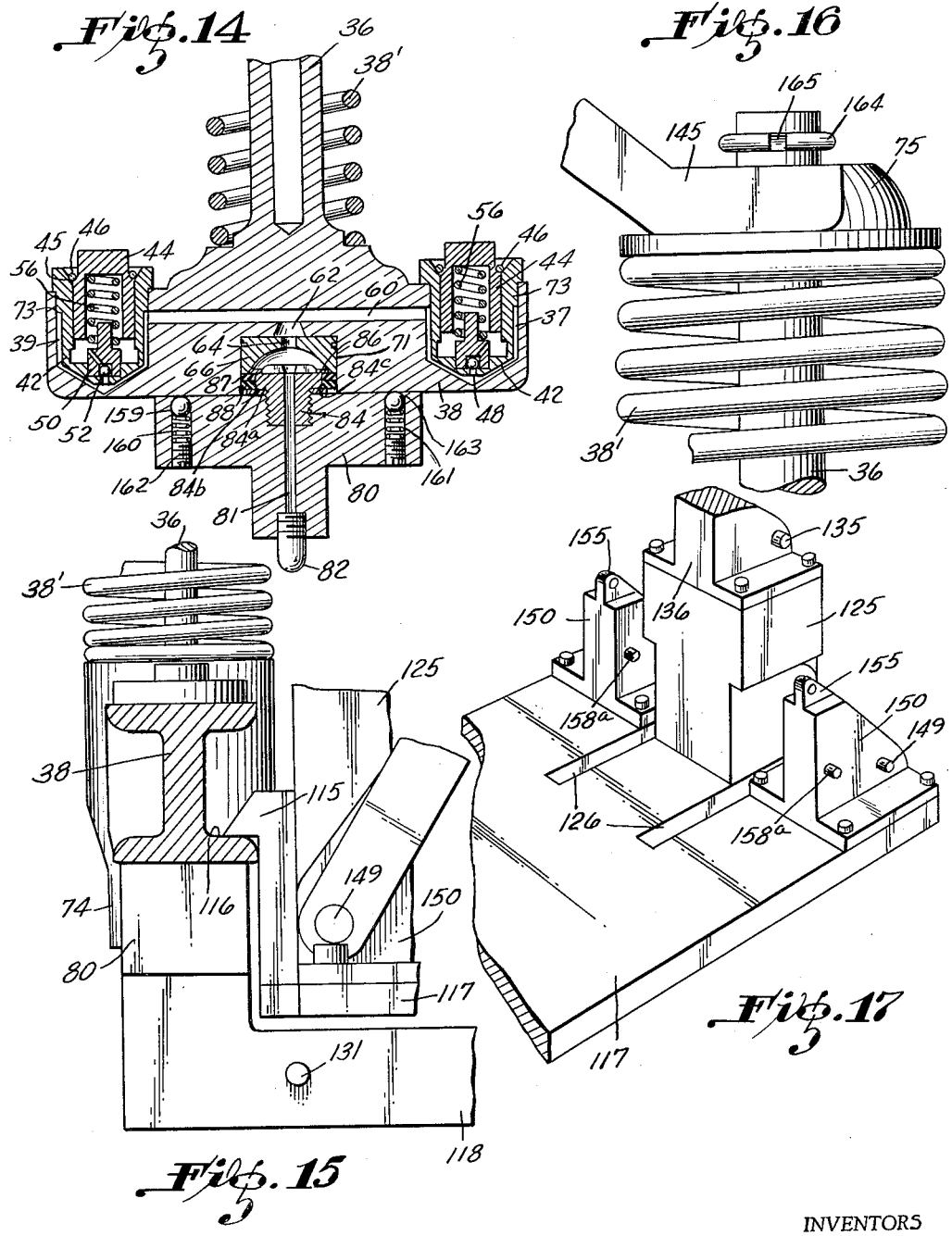

United States Patent Office 3,039,300
Patented June 19, 1962

3,039,300
SERVICING AND TESTING DEVICE FOR VALVE BRIDGES AND HYDRAULIC LASH ADJUSTERS OF DIESEL ENGINES
Clifford F. Phillips and Posy G. Stultz, Jr., Roanoke, Va., assignors to Charles M. O'Boyle, Wilmington, Del.
Filed Oct. 22, 1958, Ser. No. 768,871
14 Claims. (Cl. 73—119)

The present invention relates to servicing and testing device for value bridges and hydraulic lash adjusters of diesel engines. A type of valve bridge to which the invention is applicable is that illustrated in U.S. Patent 2,380,051, granted July 10, 1945, to E. W. Kettering, in which the valve bridge is equipped with two hydraulic lash adjusters which engage the exhaust valve stems of the engine for opening the exhaust valves on downward movement of the bridge pursuant to a rocker arm action.

Such illustration as is contained in the present application may be identified with respect to the valve bridge and hydraulic lash adjusters by the same reference numerals as employed in said patent.

It is to be understood at the outset that the valve bridge including the hydraulic lash adjusters is removed from its upright position in the engine and inverted to be placed upon the servicing and testing tool or implement of this invention.

When the parts of a diesel engine are dissassembled, the hydraulic lash adjusters as well as the valve bridge spring must be cleaned of all foreign matter, checked for wear and parts replaced as may be necessary. The ball check valves in the hydraulic lash adjusters must also be tested for leaks, that is to ascertain whether these ball check valves are seating properly and holding pressure as they are required to do in actual operation in maintaining thrust against the valve stems.

It is an object of the invention to provide a device which will perform the necessary fluid pressure tests while the valve bridge is held upon a support forming part of the device or tool of this invention, such support having a fluid-tight connection located to be received in the recess in the top of the bridge, means being provided for firmly holding the bridge on the support in fluid-tight engagement with said connection, there being several variations of such holding means for firmly holding the bridge on the support.

It is another object of the invention to provide a device for disassembling, assembling and testing hydraulic lash adjusters and removal from the bridge of the valve bridge spring.

It is a further object to provide a device or tool for removing the valve bridge spring and also for depressing the plungers of the hydraulic lash adjusters to permit removal of their snap rings whereby the plungers, springs and valves may be removed for inspection, cleaning and replacement of parts.

The invention has for a still further object to provide for the convenient return of the hydraulic testing fluid to the reservoir after each operation to avoid the discharge under pressure of such fluid from the support when the bridge is removed therefrom.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is an isometric view of a device or tool constructed in accordance with the present invention, with the parts in initial or in inoperative position;

FIGURE 2 is a similar view showing the various parts closed or in operative position;

FIGURE 3 is a side elevational view of the tool with the parts in the initial or open position;

FIGURE 4 is a similar view showing a valve bridge mounted on the support and the support in the closed and locked position;

FIGURE 5 is also a side elevational view similar to FIGURE 4, but showing the central holding means in operative position;

FIGURE 6 is a side elevational view similar to FIGURE 5, but showing the side stabilizing devices as in operative position;

FIGURE 7 is a side elevational view taken from the opposite side of the device or tool with the pump plunger handle in the down position;

FIGURE 8 is a front elevational view of the device or tool of the invention showing the bridge in position with the central holding device engaging the valve bridge spring and the side stabilizing devices engaging the plungers of the lash adjusters;

FIGURE 9 is a vertical sectional view taken on an enlarged scale through the lower head of the hydraulic fluid reservoir showing the check valve in closed position at the bottom of the pump cylinder;

FIGURE 10 is a similar view with the pump plunger raised and the check valve assembly lowered to permit return of the hydraulic test fluid to the reservoir after a testing operation;

FIGURE 11 is a fragmentary side elevational view of the base plate and support arm showing a modification in which the arm is pivoted on a floating bearing and is equipped with a screw device for tightening the support and the valve bridge in the clamp;

FIGURE 12 is a longitudinal sectional view through the support;

FIGURE 13 is a fragmentary vertical sectional view through a form of valve bridge and exhaust valve stem broken away in operating position on engine;

FIGURE 14 is a longitudinal vertical sectional view of the bridge in inverted position in place on the support;

FIGURE 15 is a fragmentary side elevational view of the clamp with the bridge in cross section thereon and with the bridge spring and shank partly broken away;

FIGURE 16 is a fragmentary side elevational view of the bridge shank, spring and cap compressed by the claw and revealing the snap ring or retainer, and FIGURE 17 is a fragmentary isometric view taken of the base and the rear portion of the tool, blocks and pedestal.

Referring more particularly to the drawings, 80 designates the support for the valve bridge in inverted position.

As shown in FIGURE 12, the support 80 is provided with a hydraulic fluid duct 81 therethrough in communication with a fluid supply under pressure through a connection 82. At its upper end the duct 81 communicates with the lower end of a fluid duct 83 in a screw plug 84 which is removably fitted into a threaded socket 85 opening through the upper surface of the support 80 upon which the top flat surface of the inverted valve bridge rests.

The plug 84 is provided with a diametrically enlarged head 84$^a$ having a shoulder 84$^b$ which receives thereunder and about the plug 84 a washer 84$^c$ compressed against the upper surface of the support 80 when the plug 84 is screwed into the socket 85. Outwardly of the plug head 84$^a$ are one or more compressible gaskets 87, 88 of neoprene or the like which are partially confined beneath a flange 86 of the plug head 84$^a$. However, the gaskets 87, 88 are of greater diameter than the flange 86 so as to extend circularly therebeyond to admit of engagement by the top rim 72 of the bearing plug 66 of the valve bridge. Initially, as the plug 84 is screwed into its socket it will clamp the washer 84ᶜ down on the support 80, the flange 86 also putting under initial compression the gaskets 87, 88 so as to form a substantially fluid-tight connection. When the top rim 72 of the bearing plug 66 is clamped down upon the outer portions of the gaskets 87, 88, this will yield a further compressive action upon the gaskets with great force expanding the gaskets radially against the recess wall 71.

When the valve bridge 38 is placed in inverted position on the support 80 its recess 71, which opens through the upper central portion of the valve bridge, is fitted over the fluid-tight connection which includes the compressible neoprene or other gaskets 87, 88. In so doing, the top rim 72 of the bearing plug 66 which is carried in the recess 71 engages the portion of the gasket 87 which projects beyond the flange 86. When, by the various means, hereinafter explained, for firmly holding the valve bridge down upon the support 80, such top rim 72 will be moved down in a compressive action upon the gaskets 87, 88, such compressive action will tend to expand the flexible and resilient gaskets 87, 88 radially outward against the wall of the recess 71, thus providing a fluid-tight joint for preventing leakage of the hydraulic fluid which is being pumped into the passages of the bridge 38 through the ducts 81, 83.

As shown in FIGURE 13, these passages are as follows: Opening 64 in the plug 66, opening 62 in the bridge 38, passages 60 in the bridge 38 connecting with the recesses 37, 39 which house the two hydraulic lash adjuster units.

Each such hydraulic lash adjuster comprises a body or shell 42 press-fitted into its recess 39 in the bridge, such press fit being indicated at 73, the body or shell 42 being hollow to constitute a cylinder for a hollow piston or plunger 44, projected downwardly by a coil spring 56 until a shoulder 45 of the plunger engages a snap ring 46 fitted near the lower open end of the body or shell 42 as a limit stop. At its upper end the spring 56 engages a fixture 50 which is at once a spring seat and valve cage or retainer for a ball valve 52 which is adapted to close upwardly against a seat at the base of a port 48.

The lower closed end of the plunger 44 is adapted to engage the upper end of the exhaust valve stem 20 and to exert pressure to open the exhaust valve when the bridge 38 is moved downwardly against the influence of its spring 38' which is coiled about the shank 36.

Spaced flat guide lugs 74 upstand from the side faces of the valve bridge 38 and these lugs are taken advantage of to tend to stabilize the bridge upon the support 80 of the present device in that such support 80 is narrow and long corresponding substantially to the width of the bridge less the thickness of the guide lugs 74 whereupon the guide lugs 74 in the inverted position of the bridge extend downwardly on opposite sides of the support 80 at substantially the central portion of the support where the fluid-tight connection 87, 88 is located.

As shown more particularly in FIGURE 1, the connection 82 at the base of the support 80 is coupled to a flexible conduit 89 which communicates through a T 90 and an elbow connection 91 with a port 92 (FIGURES 9 and 10) in the lower head 93 of an inclined reservoir 94 for a supply of hydraulic testing fluid.

Due to the inclination, the fluid in the receptacle is under a sufficient pressure head to move out through a port 95 at a higher elevation than the port 92. These ports communicate respectively with upper and lower ends of a pump cylinder 96 in which reciprocates a pump plunger 97 pivoted at 98 to a handle 99 for reciprocating the same. The handle is connected by a link 100 with the head 93 or other appropriate support.

At the base of the pump cylinder 96 is a valve seat 101 against which a ball valve 102 normally seats under the pressure of a coil spring 103 encased in a housing 104 which has an upper valve cage or retainer 105 in which the ball 102 may reciprocate in moving toward and from its seat 101.

The housing 104 is accommodated for axially sliding movement in a recess 106 formed in a screw plug 107 having a removable screw threaded fit 108 in the lower portion of the reservoir head 93. This plug 107 has a flange in the form of a nut 109 whereby the plug 107 may be screwed into and out of place. Extending below the nut or flange 109 is an externally threaded stud 110 on which is threaded a packing gland 111.

Threaded through this stud 110 is a screw spindle 112 having its upper end engaging beneath and preferably secured to the housing 104. The screw spindle 112 has affixed to its lower end thereof, which projects below the stud 110, a hand wheel 113 or the like by which the spindle 112 may be rotated up and down through the plug, thus elevating or lowering the spring housing 104 and valve retainer 105 between the two positions illustrated in FIGURES 9 and 10, FIGURE 9 showing the normal position in which the ball 102 is thrust yieldingly up against its seat 101 by the action of its coil spring 103.

As shown in FIGURE 1, the T 90 is employed to include in the fluid pressure conduit 89 a pressure registering instrument 114.

It will be apparent that for the purpose of fluid testing the bridge and its hydraulic lash adjusters under adequate pressure, it will be necessary to employ some holding means for pressing the bridge tightly down upon the support 80 and tightly down upon the fluid-tight connection 87, 88.

One manner of achieving this result is to supply a clamp of which one member is the support 80 and the other member outwardly projecting jaws 115 (FIGURE 1) which may constitute the fixed member of the clamp while the support 80 is the movable member. In the raised position of the support 80, the bridge will be clamped between such support 80 and the jaws 115, the jaws engaging a ledge 116 of the casting which is the valve bridge 38.

The fixed jaws 115 are preferably carried by a base plate 117 which may be affixed in any suitable manner to a work bench or the like and which constitutes a unitary support for all of the several devices of the invention and serves to locate all of these several instrumentalities in reference to the work to be performed upon the valve bridge held upon the support 80 in the clamp.

The support 80 is mounted at the outer free end of an arm 118 pivoted at 119 in a bracket 120 which may be affixed in any suitable manner beneath the base plate 117. FIGURES 3 and 4 show the two positions of the arm 118 and support 80, the arm being conveniently moved by means of an operating lever 121 having bifurcated legs 122, 123 pivoted at their upper ends, as indicated at 124, to opposite sides of a lever stand or pedestal 125 erected at the outer edge of the base 117. The legs 122, 123 project down and operate back and forth through slots 126 in the base plate 117 at opposite sides of the pedestal 125.

The legs 122, 123 are coupled to the arm 118 by means of toggle links 127, 128, such links being pivoted to the sides of the arm 118 at 129 and to the legs 122, 123 at 130. Front and rear stop pins 131, 132 project laterally from the arm 118 into the path of the lever legs 122, 123 to act as limit stops for the open and closed or locked positions of the lever. As shown in FIGURE 3 in the open position of the parts, the operating lever legs 122, 123 are against the rear stop 132 and, as shown in FIGURE 4, when the lever 121 is swung forwardly to close the clamp, the lever legs 122, 123 abut the front stop pins 131. In this latter position the pivot 129 will have just passed the line between the pivots 124 and 130 so as to cause a toggle lock whereby any casual thrusts rather than loosening the clamp will only tend to move the operating lever 121 more firmly against the front stop 131.

As heretofore stated, when a valve bridge is clamped between the support and jaws 115 it must be rigid and held firmly in place and held in fluid-tight engagement with the gaskets on the fluid-tight connection shown in FIGURE 12. However as these valve bridges are castings, the thickness of the same cannot be accurately controlled and where a casting is abnormally thin between its top surface and ledge 116, in other words, where the support 80 and the jaws 115 engage the same, there may be a certain looseness in the grasp of the clamp upon the bridge.

Thus one or more additional pressure devices are desirable and in the present instance advantage is taken of the valve bridge spring 38' to create a downward strong pressure of this spring by a central holding device which exerts compressive action on the spring.

This central or intermediate holding device consists of a toggle lever 133 having bifurcated legs 134 pivoted at 135 in an upstanding block 136 removably or otherwise carried upon the central or intermediate pedestal 125. The legs 134 of this toggle lever 133 are connected by toggle links 137 to a shank 138 which in turn is pivoted at 139 to an upstanding web 140 arising from the block 136. The links 137 are pivoted to the legs 134 at 141 and to the shank 138 at 142. Forward stop pins 143 project outwardly from the shank 138 in position to be engaged by incurved portions 144 in the forward edges of the legs 134 and the lever 133 is in the erected position of FIGURE 2, which position is that of a toggle lock, the toggle center 142 having passed the line between the pivots 135 and 141.

As shown in FIGURE 2 the shank 138 carries a claw 145. In the down position shown in FIGURES 2, 5 and 6, this claw is adapted to engage the valve bridge spring 38' or its cap 75. In moving to the positions of FIGURES 2 and 5, the claw has depressed the spring 38' placing the same under compression. As the claw 145 is fixed, the spring will tend to expand downwardly against the bridge causing the bridge to press down upon the support 80 with great force which will also operate to put the gaskets 87, 88 (FIGURE 12) under very high pressure to insure a leak-tight connection preventing any leakage of the testing fluid from the fluid connection 84, 87, 88.

This center or intermediate holding and spring compressing device may be also utilized to compress the valve bridge spring 38' to a point where its retaining snap ring or cotter key may be removed for the purpose of dismantling the spring from the valve bridge as for purposes of cleaning, testing the spring and replacing the same.

In addition, lateral or end holding devices are also supplied which flank the central or intermediate toggle lever 113 and which are operated by side stabilizing toggle levers 146, 147. As each of these devices may be of the same construction, a single description will suffice.

The lever 147 has bifurcated legs 148 pivoted at 149 to a block 150 removably or otherwise mounted upon the base plate 117 beside the pedestal 125. The legs 148 are connected by toggle links 151 to a shank 152 of a pressure finger 153, such shank being pivoted at 154 to a web 155 upstanding from the block 150. The toggle pivots are indicated at 156, 157. The forward stop pins are represented at 158 and the rear stop pins at 158ª. By swinging either or both levers 146, 147 forwardly, the fingers 153 will be brought down upon the plungers or pistons 44 of the hydraulic lash adjusters in the valve bridge 38 as held upon the support 80.

Another form of holding means for maintaining the bridge firmly in the clamp is illustrated in FIGURES 12 and 14, and comprises balls 159 movably mounted in sockets 160 made through the support 80 at opposite sides of the duct 81. The balls 159 are urged upwardly by coil springs 161, the tension of which is adjusted by screw plugs 162 threaded in the lower ends of the sockets 160. The upper ends 163 of the sockets are inferior to the diameter of the balls 159 so as to retain the balls against upward escape but at the same time to permit the balls to project above the top flat surface of the support 80, as shown in FIGURE 12. When the bridge 38 is clamped in the vise, as shown in FIGURE 15, the opposing pressures of the support 80 and the fixed jaws 115 will depress the balls 159, as shown in FIGURE 14, against the yielding upward thrust of the coil springs 161.

FIGURE 15 shows the bridge 38 secured tightly in the clamp where the flat top surface of the bridge rests upon the upper surface of the support and the lower edges of the jaws 115 engage the upper surface of the ledge 116 at one side of the bridge 38.

Referring more particularly to FIGURE 16, the claw 145 is shown in engagement with the cap 75 of the valve bridge spring 38', the claw 145 having moved downwardly to compress the spring and lower the cap 75 to reveal the resilient snap ring 164 for removal from its groove 165 in the lower end of the valve bridge shank 36.

Referring more particularly to FIGURE 11, another form of holding device is illustrated for firming the grasp of the clamp upon the valve bridge and for taking up any slack due to thin casting ledges 116. This construction involves the use of screws or other like fastenings 166 which are threaded into the base plate 117 from beneath, such screws 166 having heads 167 which are adapted to take up against the brackets 120, which brackets support the pivot 119. By backing down the screws 166, the heads 167 may be lowered to permit the bracket 120 to drop down on these heads a calculated distance below the bottom surface of the base plate 117. Forwardly of the screws or other fastenings 166, the arm 118 has threaded therethrough an adjusting screw 168 having affixed thereto at its lower end, spaced below the arm 118, a winged operating head 169 or the like for manually rotating the adjusting screw 168, the upper end of which freely engages the bottom surface of the base plate 117. In the event that there is loose play in the clamping action between the support 80 and the fixed jaws 115 when the lever 121 has been shifted to extreme forward locked position, also shown in FIGURE 11, the lever 121 may promptly be swung to the rear position to release the clamp for greater freedom of manual operation of the wing screw head 169. By rotating the screw 168 in one direction it may be advanced upwardly through the arm 118, thus developing thrust downwardly upon the rear end of the arm 118 through a distance determined by the dropped position of the screw heads 167. This action will cause the rear end of the arm 118 to move down and the arm to pivot about the fulcrum point 129, thereby elevating the front end of the arm and the support 80, so that when the operating lever 121 is subsequently pulled forward into the position of FIGURE 11, it will elevate the support 80 to a greater height, the action of the operating lever 121 being uniform upon the arm 118 in any position of the screw 168. To avoid any possibility of the binding of the parts when the fulcrum is shifted from 119 to 129, the holes in the bracket 120 through which the screws 166 pass may be slightly elongated or slightly larger in diameter than the external diameter of the screws 166.

When a valve bridge casting is put in position to be held firmly in the clamp for lash adjuster work to be performed, if the bridge is loose on the device all that has to be done is to turn wing screw 169 in a right-hand direction, which in turn decreases the distance between support 80 and jaws 115. This works in just the opposite manner when the wing screw 169 is turned in a left-hand direction to take care of a tight valve bridge. This arrangement allows the operator always to be able to adjust the device so that the valve bridge may be held firmly regardless of the various thicknesses of valve bridge castings. Adjustment of the screw 168 can be made when the lever 122 is against either front stop 131 or back stop 132.

Referring more particularly to FIGURE 17, this figure shows the portion of the base plate 117 back of the pedestal 125 and the bearing blocks 150. This view also shows the slots 126 in which the legs 122, 123 of the clamp operating lever 121 move freely back and forth, such legs being pivoted at 124 in the sides of the pedestal 125.

In operation, the valve bridge 38 in an inverted position is placed on the support 80 and the toggle lever 121 is then pulled forwardly until such lever goes into the locked position, shown in FIGURE 11, in which the toggle center 129 has passed rearwardly of the line between the pivots 124, 130. In this action the valve bridge is elevated by the support 80 into contact with the two fixed jaws 115, as shown in FIGURE 15, and the valve bridge is thereupon held in a substantially rigid position in the clamp. The object of holding the valve bridge in a rigid position is so that the left, center and right toggle joint levers 146, 133 and 147 may be operated to compress the springs in the hydraulic lash adjusters as well as the valve bridge spring itself. The two hydraulic lash adjuster springs 56, as well as the valve bridge spring 38', must be compressed so that the coiled locking rings 46 (FIGURES 13 and 14) and 164 (FIGURE 16) may be removed so that the disassembling of the parts can be done.

In operating the hydraulic lash adjuster toggle levers 146, 147, the operator pulls these levers forwardly from the position of FIGURE 1 to the position of FIGURE 2 (also shown in FIGURES 5 and 6) until these levers engage the forward stops 158. In so doing, the pressure fingers 153 engage the plungers 44 and depress the same moving the shoulders 45 thereof away from the coil locking rings 46. It will be noted that the fingers 153 are thin or narrow in a horizontal sense so as to engage the central portions of the projecting ends of the plungers or pistons 44 and, therefore, leaving a space above the snap rings or locking rings 46 free for the insertion of a special tool to pry out and remove the locking rings. When the locking ring is removed, the levers 146, 147 are moved to the rear position of FIGURE 1 so as to withdraw the pressure fingers 153 from the hydraulic lash adjuster plungers 44, thereby enabling the coil springs 56 to project these plungers upwardly and out for a considerable distance beyond the shells or bodies 42 whereby the plungers, the fixtures 50, and the ball valves 52 may be removed by hand for the purposes of inspection, repair or replacement of parts.

The center toggle lever 133, which operates the claw 145, is for compressing the valve bridge spring 38' as shown more particularly in FIGURE 16 so that its locking ring 164 may be easily removed with the aid of a spring expander tool. In achieving this result, the center toggle lever 133 is pulled forward until it comes against the forward stop 143. When the locking ring 164 (FIGURE 16) is removed, the lever 133 is pulled backwardly against the back stop 170 (FIGURES 3 and 4), thus raising the claw 145 out of engagement with the spring cap 75 and as long as the snap ring 164 has been removed, the cap 75 and the spring 38' may be lifted off the shank 36 (FIGURE 16). The spring 38' can then be checked for free height and calibrated for poundage.

At any time, preferably after the repair or renewal of parts is completed and the hydraulic lash adjusters reassembled to the valve bridge, a hydraulic test is made before removing the valve bridge from the clamp. By operating the hydraulic pump handle 99, as heretofore stated, a pressure is built up in the lash adjusters as is done when the lash adjusters are in normal service. The testing pressure is fifty pounds maximum and twenty pounds minimum. After the pressure is brought up to fifty pounds, as shown on the instrument 114, the right and left toggle levers 146, 147 are brought forward against the hydraulic lash adjuster plungers or pistons 44. If the ball check valves 52 of the hydraulic lash adjusters are correctly seating and holding the pressure, the pressure fingers 153 of the right and left toggle levers 146, 147 will not be able to depress such plungers or pistons 44. If the ball check valves 52 are not seating or holding, the operator will observe a movement of the hydraulic pressuge gauge 114. When the test has been completed the valve assembly 102 may be backed downwardly as shown in FIGURE 10 so that the hydraulic pressure may be relieved from the test line. When this valve 102 is opened it allows the oil to flow back to the pump reservoir and thus prevent an overflow of oil through the ducts 81, 83 (FIGURE 12) when the operator removes the valve bridge 38 from the support 80.

After the hydraulic test has been made and if any one or both of the hydraulic lash adjusters are found to be defective, the lash adjuster bodies or shells 42 will have to be removed from the valve bridge 38. This is done by a special tool which is the subject matter of our copending application, Serial No. 768,872, filed October 22, 1958, and entitled Lash Adjuster Body Pulling Tool for Diesel Engines.

After repair of the removed parts of the hydraulic lash adjuster, the same may be reassembled to the valve bridge by a special tool which forms the subject matter of our copending application, Serial No. 768,873, filed October 22, 1958, and entitled Installing Tool for Assembling Hydraulic Lash Adjuster Bodies of Diesel Engines.

In making the test of the hydraulic lash adjuster ball valves it will be understood that it is important that the gaskets 87, 88 (FIGURES 12 and 14), which constitute a fluid-tight connection carried by the support 80, be leak-proof in order to maintain the test pressure within the passages of the valve bridge and to this end it is important that the bridge be held down firmly against this connection involving the gaskets 87, 88. This tight fit will normally result from the clamping action between the support 80 and the jaws 115, but in case of any looseness the center toggle lever 133 may be pulled forward so that its claw 145 will compress the spring 38' and the toggle lever remains in its forward locked position during the hydraulic fluid test, with the spring 38' exerting its expansive pressure downwardly upon the bridge. At the same time the right and left toggle levers 146, 147 are brought forward and the fingers 153 thereof exert pressure upon the hydraulic lash adjuster plungers or pistons 44 so that they also exercise a downward pressure upon the valve bridge tending to maintain the fluid pressure connection tight between the support 80 and such valve bridge 38. These side toggle levers 146, 147 also perform a stabilizing function on the bridge which is elongated, and as a matter of fact extends beyond the ends of the support 80, as shown in FIGURE 14. The pressure fingers 153 will thus tend to rock the bridge into a fluid-tight connection with the gaskets 87, 88 (FIGURE 12).

Although we have disclosed herein the best forms of the invention known to us at this time, we reserve the right to all such modifications and changes as may come within the scope of the following claims.

We claim:

1. For use with a diesel engine valve bridge having hydraulic lash adjusters with exposed spring-projected plungers and valves controlling entrance to the hydraulic lash adjusters of hydraulic liquid through passages in the bridge having a common liquid inlet recess opening externally of the bridge, a servicing device comprising a support for receiving the bridge, liquid pressure means connected to the support to supply gauged test hydraulic liquid under pressure through the recess to the bridge passages and hydraulic lash adjusters, individually manually operated plunger-pressure means on the device positioned opposite the spring-pressed plungers in their situation on the support for independently applying test pressure to the plungers, and locking means forming a part of the plunger-pressure means for locking the latter means in applied pressure position against the plungers.

2. For use with a diesel engine valve bridge having hydraulic lash adjusters with exposed spring-projected plungers and valves controlling entrance to the hydraulic lash adjusters of hydraulic liquid through passages in the bridge having a common liquid inlet recess opening externally of the bridge, a servicing device comprising a support for receiving the bridge and having an opening communicating with the bridge recess in the seated position of the bridge upon the support, liquid pressure means communicating with the opening and connected to a supply of gauged test hydraulic liquid under pressure, and at least two independently and sequentially operable plunger-pressure means on the device positioned opposite the spring-pressed plungers in their location on the support for applying pressure to the plungers.

3. For use with a diesel engine valve bridge having hydraulic lash adjusters with exposed spring-projected plungers and valves controlling entrance to the hydraulic lash adjusters of hydraulic liquid through passages in the bridge having a liquid inlet recess opening externally of the bridge through an intermediate portion thereof between the hydraulic lash adjusters, said bridge having a shank extending downwardly therefrom with a shank spring and cap normally confined on the shank, a servicing device comprising a support for receiving the bridge in an inverted position and having an opening adapted to communicate with the bridge recess in the seated portion of the bridge on the support, liquid pressure means connected to the support for supplying gauged test hydraulic liquid under pressure through the opening to the bridge recess and passages, a compressible sealing means about the opening adapted to be engaged by a part of the bridge in its seated position, shank spring pressure means on the device positioned to apply to the shank spring pressure in a thrust direction toward the support, and plunger-pressure means on the device at opposite sides of the shank spring pressure means located to apply pressure to the plungers.

4. For use with a diesel engine valve bridge having hydraulic lash adjusters with exposed spring projected plungers and valves controlling entrance to the hydraulic lash adjusters of hydraulic liquid through passages in the bridge having a liquid inlet recess with a lateral wall opening through the top portion of the bridge and also having a bearing plug in the lower portion of the recess, a servicing device comprising a support on which the top portion of the inverted bridge is adapted to seat, said support having an opening for communicating with the recess and with a source of gauged test hydraulic liquid under pressure, a compressible sealing means about the opening positioned to enter the recess and abut the bearing plug, thrust means on the device located relatively to the support to exert thrust on the bridge against a portion thereof lower than the top portion in a direction toward the support to at once hold the bridge substantially rigidly on the support and to expand the sealing means against the lateral wall of the recess, and plunger-pressure means on the device located to apply pressure against the plungers.

5. For use with a diesel engine valve bridge having hydraulic lash adjusters with exposed spring-projected plungers and valves controlling entrance to the hydraulic lash adjusters of hydraulic fluid through passages in the bridge having a liquid inlet recess opening through a top portion of the bridge intermediate the hydraulic lash adjusters, said bridge also having a shank extending downwardly therefrom with a shank spring and cap normally confined on the shank, a servicing device comprising a support on which the top portion of the inverted valve bridge is adapted to be seated with the shank extending upwardly, shank spring pressure means on the device positioned to apply to the shank spring pressure in a thrust direction toward the support to assist in holding the bridge on the support, liquid pressure means for supplying liquid under pressure to the lash adjusters, and plunger-pressure means on the device at opposite sides of the shank spring pressure means located to apply pressure to the plungers.

6. A servicing device as claimed in claim 5 in which said shank spring pressure means and said plunger-pressure means include levers fulcrumed on the device connected to the last two mentioned means by toggle links locking the levers in the pressure applied positions of the last two mentioned means.

7. For use with a diesel engine valve bridge having hydraulic lash adjusters with exposed spring-projected plungers and valves controlling entrance to the hydraulic lash adjusters of hydraulic fluid through passages in the bridge having a liquid inlet recess opening through a top portion of the bridge intermediate the hydraulic lash adjusters, said bridge also having a shank extending downwardly therefrom with a shank spring and cap, normally confined on the shank, a servicing device comprising a movable support on which the inverted valve bridge is adapted to be seated, shank-spring pressure and plunger-pressure means on the device, support shifting means on the device coupled to the support to move the support and valve bridge to an operative position in which the shank spring and plungers are accessible respectively to the shank-spring pressure and plunger-pressure means.

8. A servicing device as claimed in claim 7 further comprising a clamp member on the device located to be engaged by a part of the valve bridge when the support is shifted to the operative position.

9. A servicing device as claimed in claim 8 further comprising adjusting means for moving the support through short distances toward and from the clamp member to assure tight clamping action upon the valve bridge between the support and clamp member in said operative position, said adjusting means located between the movable support and the device.

10. A servicing device as claimed in claim 8 further comprising spring-pressed thrust members in the support biased to a projected position in position to be engaged by the top portion of the inverted valve bridge incident to placing the bridge on the support.

11. A servicing device as claimed in claim 8 further comprising an arm carrying said support by which the support derives its movability, a loose pivotal mounting for the arm on the device, an operating lever pivoted to the device and connected by linkage to said arm, an adjusting means carried by said arm between the loose pivotal mounting and linkage connection in position to engage the device to rock the arm about the linkage connection in addition to the movement of the arm about the loose pivotal mounting generated by the action of said lever.

12. For use with a diesel engine valve bridge having hydraulic lash adjusters with exposed spring-projected plungers having removable confining means and valves controlling entrance to the hydraulic lash adjusters of hydraulic liquid through passages in the bridge having a common liquid inlet recess opening externally of the bridge and further having a shank extending downwardly therefrom with a shank spring and spring confining means detachably connected to the shank, a servicing device comprising a support adapted to receive the bridge in an inverted position with the recess down and the plungers and shank up, said support having an opening adapted to communicate with the bridge recess and connected to a source of gauged test hydraulic liquid under pressure, shank spring pressure means on the device positioned to apply to the shank spring pressure in a thrust direction toward the support for firmly holding the bridge on the support during assembly and dismantling operations and for releasing the spring pressure from the shank confining means for removal and replacement thereof, and plunger-pressure means on the device at opposite sides of the shank spring pressure means operable independently of one another and of the shank spring pressure means and located to apply pressure to the plungers for depressing the plungers to permit release of the plunger confining means in a dismantling operation and to apply pressure to the reassembled plungers in a test operation to test for leakage of the lash adjuster valves.

13. A servicing device as claimed in claim 12 in which the shank spring pressure means and the plunger-pressure means include toggle operating levers adapted to lock in the pressure applied positions to hold the shank spring compressed and the plungers depressed during dismantling and reassembly of the respective confining means.

14. A servicing device as claimed in claim 12 in which said support is movable up and down whereby in the down position the bridge may be applied and removed, a clamp member on the device positioned to engage from above a part of the bridge in the raised operative position of the support, and a toggle lever on the device connected to the support to raise and lower the same and to enter into toggle locked condition in the upper position of the support.

References Cited in the file of this patent

UNITED STATES PATENTS

| | | |
|---|---|---|
| 2,263,801 | Graham | Nov. 25, 1941 |
| 2,536,602 | Goett | Jan. 2, 1951 |
| 2,658,386 | Guichard | Nov. 10, 1953 |
| 2,690,670 | Delehanty | Oct. 5, 1954 |
| 2,716,888 | Svenson | Sept. 6, 1955 |
| 2,744,407 | Kruger et al. | May 8, 1956 |